US009788406B2

United States Patent
Klennert (10) Patent No.: US 9,788,406 B2
(45) Date of Patent: Oct. 10, 2017

(54) LASER COOLING VIA STIMULATED PHOTON EMISSIONS

(71) Applicant: The Boeing Company, Chicago, IL (US)

(72) Inventor: Wade L. Klennert, Albuquerque, NM (US)

(73) Assignee: THE BOEING COMPANY, Chicago, IL (US)

( * ) Notice: Subject to any disclaimer, the term of this patent is extended or adjusted under 35 U.S.C. 154(b) by 185 days.

(21) Appl. No.: 14/546,537

(22) Filed: Nov. 18, 2014

(65) Prior Publication Data

US 2016/0141063 A1    May 19, 2016

(51) Int. Cl.
| | | |
|---|---|---|
| G21K 1/00 | (2006.01) | |
| H05H 3/00 | (2006.01) | |
| H01S 3/042 | (2006.01) | |
| H01S 3/04 | (2006.01) | |
| F25B 23/00 | (2006.01) | |
| H01S 3/16 | (2006.01) | |
| H01S 3/17 | (2006.01) | |

(52) U.S. Cl.
CPC ............... *H05H 3/00* (2013.01); *H01S 3/042* (2013.01); *H01S 3/0408* (2013.01); *F25B 23/00* (2013.01); *H01S 3/1618* (2013.01); *H01S 3/17* (2013.01)

(58) Field of Classification Search
CPC .. F25B 21/00; F25B 23/003; F25B 2321/001; G21K 1/006; H05H 3/00; H01S 3/042; H01S 3/0408; H01S 3/094092; H01S 3/17
See application file for complete search history.

(56) References Cited

U.S. PATENT DOCUMENTS

| | | | | |
|---|---|---|---|---|
| 4,405,237 | A * | 9/1983 | Manuccia | G01J 3/44 356/301 |
| 5,447,032 | A * | 9/1995 | Epstein | F25B 23/003 62/3.1 |
| 6,560,478 | B1 * | 5/2003 | Alfano | A61B 5/0075 600/473 |
| 6,795,777 | B1 * | 9/2004 | Scully | G01J 3/4412 250/251 |
| 8,720,219 | B1 * | 5/2014 | Sheik-Bahae | F25B 23/00 372/34 |
| 9,127,985 | B2 * | 9/2015 | Littleton | G01N 21/65 |
| 9,404,854 | B2 * | 8/2016 | Hunt | G01N 21/3581 |
| 2012/0312028 | A1 * | 12/2012 | Kashyap | F25B 23/00 62/3.1 |
| 2014/0268131 | A1 * | 9/2014 | Tamada | G01N 21/65 356/301 |
| 2015/0194782 | A1 * | 7/2015 | Eden | H01S 3/094096 372/70 |

(Continued)

OTHER PUBLICATIONS

R.H. Dicke, "Coherence in Spontaneous Radiation Processes", Jan. 1, 1954, Physical Review, vol. 93, No. 1, pp. 99-110.*

(Continued)

*Primary Examiner* — Christopher R Zerphey
(74) *Attorney, Agent, or Firm* — Toler Law Group, PC (57) ABSTRACT

An example laser cooling system may include a first laser to induce a transition of a plurality of electrons in a medium to an excited energy state via absorption of photons. The laser cooling system may also include a second laser to stimulate emission from the medium of emitted photons having a higher energy than an energy of the absorbed photons.

22 Claims, 6 Drawing Sheets

(56) References Cited

U.S. PATENT DOCUMENTS

2016/0290928 A1* 10/2016 Krishnamachari G02B 21/0032

OTHER PUBLICATIONS

Florian, Schwan, and Schmid, "Superradiance and High-Gain Mirrorless Laser Activity of O2-Centers in KCI", 1982, Solid State Communications, Wol 42, No. 1, pp. 55-57.*
Andrianov and Samartsev, "OPtical Superradiation and Laser Cooling", 1997, Laser Physics, vol. 7, No. 2, pp. 314-317.*
Petrushkin and Samartsev, "Superradiance Regime of Laser Cooling of Crystals and Glasses Doped with Rare-Earth Ions", 2001, Laser Physics, vol. 11, No. 8, pp. 948-956.*
E.K. Bashkirov, "Dynamics of Phonon Mode in Superradiance Regime of Laser Cooling of Crystals", May 11, 2005, Physics letters A 341, 345-351.*
Eliot B. Petersen, 'Cavity Enhanced THZ Generation in Nonlinear Crystals Pumped by Near-IR Fiber Lasers', A Dissertation Submitted to the Faculty of the Department of Physics in Partial Fulfillment of the Requirements for the Degree of Doctor of Philosophy in the Graduate College The University of Arizona; Jul. 17, 2012; (116 pgs).
Hoyt, C. W., et al., "Observation of Anti-stokes Fluorescence Cooling in Thulium-doped Glass." vol. 85, No. 17 Physical Review Letters. Oct. 23, 2000, 4 pgs.
Hoyt, C. W., et al., "Advances in Laser Cooling of Thulium-doped Glass." Journal Opt. Soc. Am. B/vol. 20, No. 5. May 2003, pp. 1066-1074.
Mungan, C.E., et al., "Internal Laser Cooling of Yb3+-doped Glass Measured Between 100K and 300K." Appl. Phys. Lett. 71, 1997, pp. 1458-1460.
Stenhom, S., "The semiclassical theory of laser cooling." Reviews of Modern Physics, vol. 58 No. 3. Jul. 1986, 41 pgs.
Mungan, C.E., et al., "Laser Cooling of a Solid by 16K Starting From Room Temperature," vol. 78, No. 6 Physical Review Letters. Feb. 10, 1997, 4 pgs.
Bowman, et al., Bowman, S.R., et al., "New Materials for Optical Cooling," Applied Physics B—Lasers and Optics, Dec. 2000, Applied Physics B. vol. 71, pp. 807-811.
Fernandez, Fernandez, J.R., "Anti-Stokes laser cooling in Yb3+-doped KPb2CI5 crystal," Sep. 1, 2002, vol. 27, No. 17, Optics Letters 1525, pp. 78-82.

\* cited by examiner

LASER COOLING VIA STIMULATED PHOTON EMISSIONS

FIELD

The present disclosure generally relates to laser cooling.

BACKGROUND

Laser cooling may be used for cryogenic cooling applications (e.g., cooling of components such as detectors, satellite components, etc.) and for cooling of laser crystals. In the latter case, the cooling can be used to augment or supplant the usual conduction cooling of the laser crystal in a bulk or gross fashion.

Laser cooling occurs when laser light is absorbed by a medium, causing the medium to subsequently re-radiate light at a higher frequency (energy). In some cases, a small majority of the photons spontaneously emitted by the medium are higher in energy than the absorbed laser photons, resulting in a net heat loss of the medium. Thus, the efficiency of laser cooling the medium may be limited by an amount of photons that the medium absorbs and a probability of the medium emitting light at a higher frequency than the absorbed laser light.

SUMMARY

In an embodiment, a laser cooling system includes a first laser to induce a transition of a plurality of electrons in a medium to an excited energy state via absorption of photons. The laser cooling system also includes a second laser to stimulate emission from the medium of emitted photons having a higher energy than an energy of the absorbed photons.

In another embodiment, a method of laser cooling includes using a first laser to direct light having a first wavelength toward a medium during a first time period. The light having the first wavelength may induce a transition of a plurality of electrons in the medium to an excited energy state via absorption of photons. The method also includes using a second laser to direct light having a second wavelength toward the medium during a second time period. The light having the second wavelength may stimulate emission from the medium of emitted photons having a higher energy than an energy of the absorbed photons.

In another embodiment, a laser cooling system includes a first pulsed laser and a second pulsed laser. The first pulsed laser may direct pulses of light having a first wavelength toward a medium to induce a transition of a plurality of electrons in the medium to an excited energy state via absorption of photons. The second pulsed laser may direct pulses of light having a second wavelength toward the medium to stimulate emission from the medium of emitted photons having a higher energy than an energy of the absorbed photons.

The described features, functions, and advantages may be achieved independently in various embodiments or may be combined in yet other embodiments further details of which can be seen with reference to the following description and drawings.

DETAILED DESCRIPTION

The present disclosure describes a system and method of laser cooling that utilizes laser(s) to cool a medium (e.g., a solid, a liquid or a gas phase material). A laser cooling system may include a first laser that directs light (e.g., having a first wavelength) toward the medium to induce a transition of electrons in the medium to an excited energy state via absorption of photons. The laser cooling system may also include a second laser that directs light (e.g., having a second wavelength) toward the medium to stimulate emission of photons from the medium such that the emitted photons have a higher energy than an energy of the absorbed photons. While the present disclosure refers to multiple lasers for laser cooling, it will be appreciated that in alternative embodiments a single laser may be tunable (or may be used in conjunction with a phase modulator and/or a wavelength modulator) to direct laser light having the first wavelength toward the medium and to direct laser light having the second wavelength toward the medium. Stimulating the emission of photons from the medium (e.g., using a second laser) may allow for more efficient laser cooling compared to systems that use a single continuous wave (CW) laser to excite electrons and that rely on spontaneous emission of photons for cooling.

As an illustrative example, the laser cooling system may include a pump laser source that applies the first laser to the medium. A wavelength of light generated by the first laser is selected such that photons from the pump laser source are absorbed by particular particles of the medium (e.g., atoms or molecules) causing some electrons of the medium to enter an excited state. The laser cooling system also includes a seed laser. A wavelength of light generated by the seed laser is selected such that photons of the seed laser stimulate relaxation of at least some of the electrons in the excited state, resulting in emission of photons by the medium. In particular, interaction of excited state electrons with the seed laser light may cause emission of photons at the same wavelength as the wavelength of the seed laser light. Thus, electrons enter the excited state by absorption of photons having the first wavelength from the pump laser and emit photons having a second wavelength based on the seed laser. Since the light generated by the seed laser is at a shorter wavelength (e.g., higher energy) the emitted photons are higher energy photons than the absorbed photons, resulting in a net energy decrease (and therefore cooling) of the medium.

Additionally, the pump laser, the seed laser, or both, may be pulsed to increase a rate at which a particular number of electron excitations and photon emissions occur in the medium over a particular period of time. For example, conventional laser cooling relies on spontaneous emission of photons from the medium, which is limited by the radiative lifetime of the medium. By pulsing one or both of the lasers to stimulate emission of photons (as opposed to waiting for spontaneous emission), the laser cooling system may increase a rate at which the medium is cycled (e.g., may decrease a time to excite a particular number of electrons by photon absorption and may decrease a time to relax the electrons by photon emission). Thus, a rate of cooling may be increased since each absorption/emission cycle results in a net decrease in energy (and therefore cooling) of the medium.

For example, a laser cooling system of the present disclosure may stimulate emission of photons from excited electrons using a narrow band pulsed laser as the seed laser. The seed laser may be pulsed at a rate such that multiple pulses of light from the seed laser are applied to the medium during a radiative lifetime of the medium. Each pulse may stimulate emission of photons, thereby relaxing the electrons from the excited state, and cooling the medium. Thus, the seed laser may stimulate emission of photons such that the energy emitted by the medium (via the emitted photons) is greater than the energy absorbed by the medium from the pump laser. Stimulating photon emission may reduce constraints on pump laser wavelength and may allow atoms or molecules to be cycled at an increased rate, resulting in removal of more heat than typical laser cooling systems that rely on spontaneous emission.

In contrast, laser cooling systems that rely on spontaneous emissions from an excited state may be relatively slow as compared to embodiments described herein. There is a low probability of an energy of a particular spontaneously emitted photon being higher than an energy of an absorbed photon. For example, spontaneous emission is a broad-band emission that corresponds to a Doppler broadened absorption profile of an atom or a molecule, which includes both high energy emissions and low energy emissions (with respect to a center of the profile). Low energy emissions do not contribute to cooling and limit the efficiency of the laser cooling system. By stimulating emissions at higher energies, the efficiency of the laser cooling system may be increased for each absorption/emission cycle. In some embodiments, by pulsing both the pump laser and the seed laser, the frequency of the cooling cycle may be increased compared to waiting for spontaneous emissions. For each absorption/emission cycle, heat is removed from the medium and the amount of energy (e.g., measured in Watts) that is removed from the medium increases.

As an illustrative, non-limiting example, for an atom of Ytterbium (Yb) in a host glass material, an average spontaneous emission from $Yb^{3+}$ is 1.815 milliseconds (ms), depending on the particular host glass material. As such, a number of absorption/emission cycles per second may be about 551 cycles per second (i.e., 1 divided by 0.001815 seconds) when waiting for spontaneous emission to occur. An atom of Ytterbium ($Yb^{3+}$) in a host glass material may have an absorption spectrum from about 950 nanometers (nm) to about 1050 nm. In this example, "red-shifted" laser light having a first wavelength (e.g., about 1025 nm) may be used for excitation of electrons of the Yb atoms in the host glass material, while "blue-shifted" laser light having a second wavelength (e.g., about 975 nm) may be used for stimulated emission of higher energy photons. By using a pulsed seed laser having a pulse width of 100 nanoseconds (ns) and a ten percent duty cycle, the absorption/emission cycle rate of the atoms (Yb atoms in this example) can be increased. In this illustrative example, a number of absorption/emission cycles per second may be about one million cycles per second (i.e., 1 divided by 0.000001 seconds per laser pulse), corresponding to an increase of 181388% in cycles per second. Such example operating conditions are for illustrative purposes only, in order to show potential benefits of pulsed operation. It will be appreciated that various operating parameters, including a pump laser pulse width, a pump laser duty cycle, a seed laser pulse width, a seed laser duty cycle, etc., may be adjusted for laser cooling of a particular material.

Figure 1:
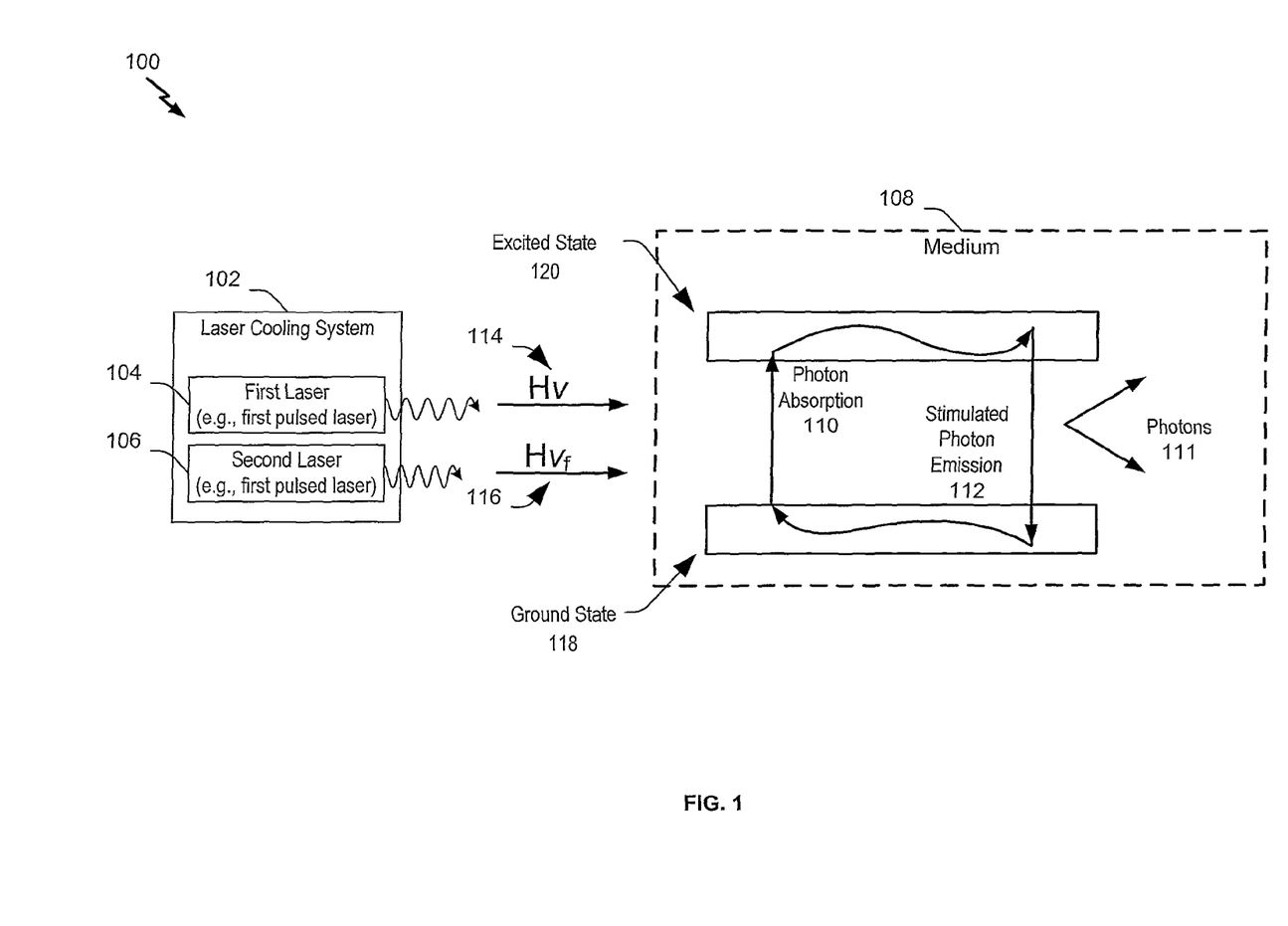
FIG. 1 is a block diagram of a particular embodiment of a laser cooling system that includes a first laser and a second laser.

Referring to FIG. 1, a particular embodiment of a system that utilizes multiple lasers for laser cooling is illustrated and generally designated 100. FIG. 1 illustrates one example of a laser cooling system 102 that includes a first laser 104 and a second laser 106. The first laser 104 may induce a transition of electrons in a medium 108 to an excited energy state via absorption of photons (as shown at 110), and the second laser 106 may stimulate emission of photons 111 (as shown at 112) that have a higher energy than an energy of the absorbed photons. In other embodiments, an alternative number of lasers (e.g., more than one laser) may be used to excite electrons in the medium 108, an alternative number of lasers (e.g., more than one laser) may be used to stimulate the emission of photons 111 from the medium 108, or a combination thereof.

In the embodiment illustrated in FIG. 1, the first laser 104 is configured to generate light having a first wavelength 114 (e.g., Hv), and the second laser 106 is configured to generate light having a different second wavelength 116 (e.g., $Hv_f$). As an illustrative, non-limiting example, in the case of an atom of Ytterbium ($Yb^{3+}$) in a host glass material, the first wavelength 114 may be greater than about 1000 nm (e.g., a center of an absorption spectrum for such a material, from about 950 nm to 1050 nm), and the second wavelength 116 may be less than about 1000 nm. To illustrate, light having a wavelength that is greater than about 1000 nm (e.g., about 1025 nm) represents "red-shifted" laser light for such a medium, while light having a wavelength that is less than about 1000 nm (e.g., about 975 nm) represents "blue-shifted" laser light for such a medium. In this example, the first laser 104 may direct light having the first wavelength 114 of about 1025 nm toward the medium 108 (for excitation), and the second laser 106 may direct light having the second wavelength 116 of about 975 nm toward the medium 108 (to stimulate photon emission at about 975 nm, resulting in a net heat loss per photon). As described further herein with respect to FIG. 2, the first laser 104 may be a first pulsed laser that generates pulses of light having the first wavelength 114 based on a first pulse rate and duration, and the second laser 106 may be a second pulsed laser that generates pulses of light having the second wavelength 116 based on a second pulse rate and duration. In other embodiments, the first laser 104 may be a continuous wave laser that generates light having the first wavelength 114, and the second laser 106 may be a pulsed laser that generates pulses of light having the second wavelength 116 based on a particular pulse rate and duration.

FIG. 1 further illustrates that the first laser 104 may induce a transition of a plurality of electrons in the medium 108 to an excited energy state. In the example of FIG. 1, electrons may transition from a ground state 118 to an excited state 120 via absorption of photons of light that are directed toward the medium 108 from the first laser 104, as shown at 110. In other cases, the first laser 104 may induce a transition of electrons in the medium 108 to an alternative excited energy state. After the photon absorption 110, the second laser 106 may stimulate emission of photons 111 from the medium 108, as shown at 112. The photons 111 emitted from the medium 108 may have a higher energy than an energy of the absorbed photons.

In operation, the first laser 104 may generate light having the first wavelength 114 and may direct the light toward the medium 108. In some cases, the first wavelength 114 may be determined based on a photon absorption profile associated with the medium 108. As described further herein with respect to FIG. 3, the first wavelength 114 may represent "red-shifted" laser light (based on a particular photon absorption profile). In some cases, the first laser 104 may represent a "pump" laser, with the light at the first wavelength 114 being used to "pump" electrons of the medium 108 to an excited energy state (e.g., from the ground state 118 to the excited state 120). In a particular embodiment, the laser cooling system 102 uses so-called "Doppler cooling." Thus, by reducing a frequency of laser light to the first wavelength 114, which is below an absorption wavelength of the medium 108 ("red shifting" the laser light), atoms of the medium 108 may absorb photons of the first laser 104 only if the atoms are moving towards a source of the "red-shifted" laser light (the first laser 104 in this case), due to the Doppler effect. A probability associated with an atom emitting a photon having a higher energy than an energy of the absorbed photon (having a wavelength corresponding to the "red-shifted" laser light) may be greater than a probability associated with the atom emitting a photon having the same energy as the absorbed photon, resulting in the so-called "Doppler cooling" of the medium 108.

A radiative lifetime may be associated with spontaneous emission of photons from the medium 108 after the absorption of the photons. Some spontaneously emitted photons have a higher energy than the absorbed photons, while other spontaneously emitted photons have a lower energy than the absorbed photons (e.g., in accordance with a Gaussian distribution, as described further herein with respect to FIG. 3). Spontaneously emitted photons that have a lower energy than the absorbed photons do not induce cooling or induce less cooling than emitted photons that have a higher energy. Thus, cooling from spontaneous emission may be dominated by a majority of the emitted photons having a higher energy than an energy of the absorbed photons. Rather than relying on spontaneous emission of a subset of the higher energy photons from the medium 108 for cooling of the medium 108, the second laser 106 may represent a "seed" laser, with the light having the second wavelength 116 being used to stimulate emission of photons 111 from the medium 108. In a particular embodiment, the second wavelength 116 may be selected to stimulate emission of a larger portion of higher energy photons compared to a portion of higher energy photons associated with spontaneous emission. As described further herein with respect to FIG. 3, the second wavelength 116 may represent "blue-shifted" laser light (based on a particular photon absorption profile).

In some cases, the first laser 104 may be a first pulsed laser that directs light having the first wavelength 114 toward the medium 108 during a first time period. To illustrate, after the first laser 104 has induced the transition of electrons of the medium 108 from the ground state 118 to the excited state 120 (during the first time period), the second laser 106 may direct light having the second wavelength 116 toward the medium 108 during a second time period. In some cases, a third time period may separate the first time period and the second time period. In a particular embodiment, the third time period may be less than a radiative lifetime associated with spontaneous emission of photons 111 from the medium 108 after absorption of photons having the first wavelength 114 generated by the first laser 104. In a particular embodiment, the light that is generated by the second laser 106 may have a higher energy and a shorter wavelength than the light that is generated by the first laser 104. The higher energy, shorter wavelength light generated by the second laser 106 may stimulate photon emission from the medium 108.

Figure 2:
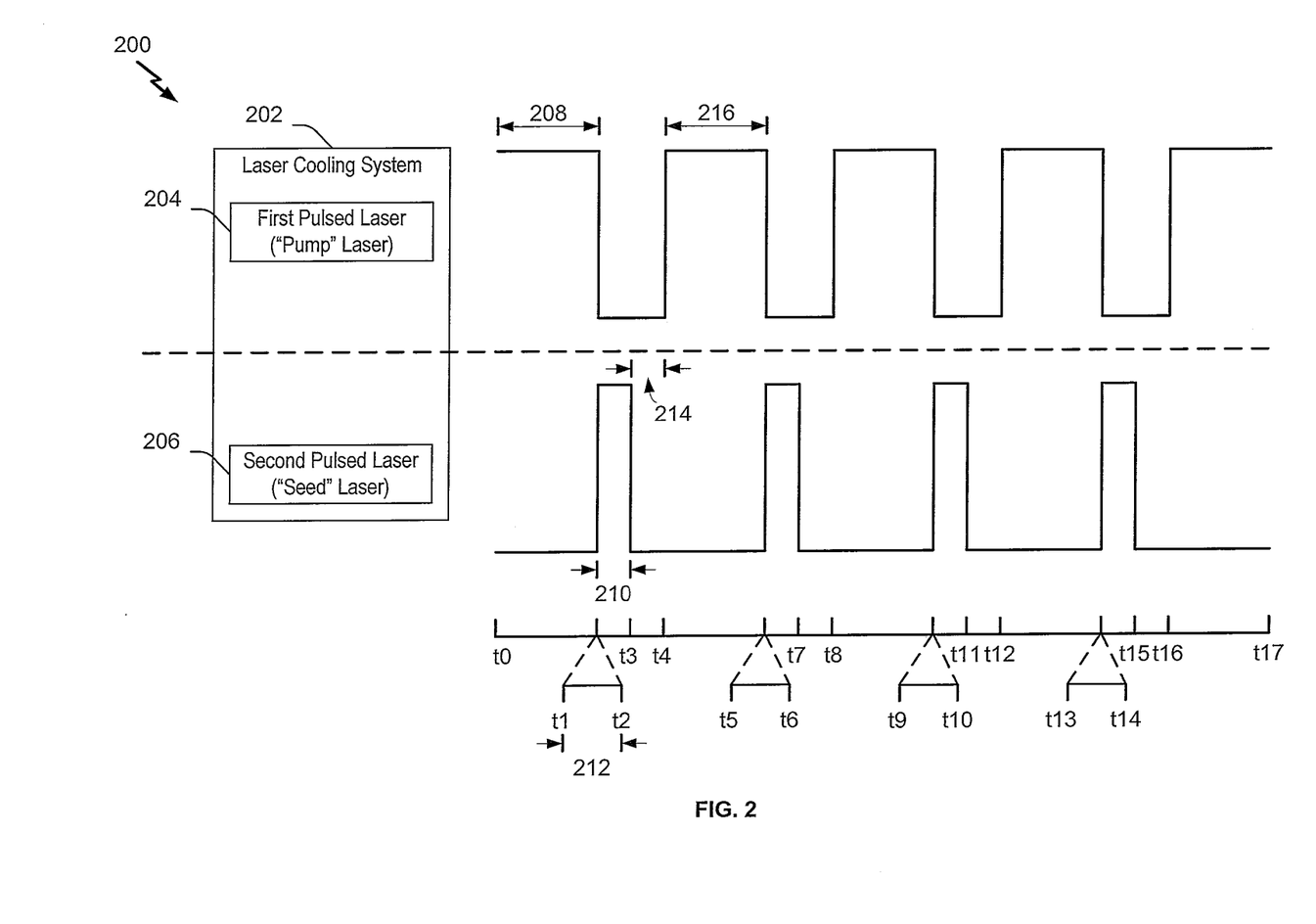
FIG. 2 is an illustration depicting a particular embodiment of a timing diagram associated with pulses of light that are generated by different pulsed lasers of a laser cooling system.

As described further herein with respect to FIG. 2, the first time period during which the first laser 104 directs the light having the first wavelength 114 toward the medium 108 may correspond to a first pulse width, and the second time period during which the second laser 106 directs the light having the second wavelength 116 toward the medium 108 may correspond to a second pulse width. In some cases, the first pulse width may be greater than the second pulse width. After stimulating photon emission from the medium 108 by directing the light having the second wavelength 116 toward the medium 108 (during the second time period), the second laser 106 may refrain from directing light having the second wavelength 116 toward the medium 108. Subsequently, the first laser 104 may direct light having the first wavelength 114 toward the medium 108 in order to "pump" the medium 108 (to excite electrons in the medium 108 to an excited energy state). After "pumping" the medium 108 (e.g., exciting electrons from the ground state 118 to the excited state 120), the first laser 104 may refrain from directing light having the first wavelength 114 toward the medium 108. The second laser 106 may then direct light having the second wavelength 116 toward the medium 108 in order to stimulate photon emission from the medium 108.

Thus, FIG. 1 illustrates that multiple lasers may be used to improve cooling efficiency compared to laser cooling systems that utilize a single continuous wave (CW) laser to excite electrons and wait for spontaneous emission of a subset of photons with a higher energy to induce cooling. By contrast, the first laser 104 of the laser cooling system 102 illustrated in FIG. 1 induces a transition of a plurality of electrons in the medium 108 from the ground state 118 to the excited state 120 (via absorption of photons of light having the first wavelength 114). The second laser 106 stimulates emission of photons 111 from the medium 108 that have a higher energy than an energy of the absorbed photons.

FIG. 2 illustrates an example of a timing diagram 200 that is associated with pulses of light that are generated by multiple pulsed lasers of a laser cooling system 202. The example of FIG. 2 is non-limiting, and the pulses of light may have different profiles (e.g., a sine wave profile, a sawtooth profile, or a trapezoidal profile, among other alternatives. In the embodiment illustrated in FIG. 2, the laser cooling system 202 includes a first pulsed laser 204 (a "Pump" laser) to generate pulses of light having a first wavelength based on a first pulse rate and duration (e.g., to excite electrons of a medium via absorption of photons) and a second pulsed laser 206 (a "Seed" laser) to generate pulses of light having a second wavelength based on a second pulse rate and duration (e.g., to stimulate emission of photons 111 having a higher energy than an energy of the absorbed photons).

FIG. 2 illustrates that the first pulsed laser 204 of the laser cooling system 202 may generate light having the first wavelength (to be directed toward a medium, such as the medium 108 of FIG. 1) during a first time period 208. The first time period 208 may correspond to a first pulse width (e.g., a time period from time t0 to time t1). During the first time period 208, the first pulsed laser 204 may direct the light having the first wavelength toward the medium in order to "pump" the medium by inducing electrons to transition to an excited energy state. For example, referring to FIG. 1, electrons of the medium 108 may be induced to transition from the ground state 118 to the excited state 120.

FIG. 2 further illustrates that the second pulsed laser 206 may direct the light having the second wavelength toward the medium during a second time period 210 (corresponding to a second pulse width). During the second time period 210, the second pulsed laser 206 may direct the light having the second wavelength toward the medium in order to "seed" the medium (i.e., to stimulate emission of higher energy photons from the medium). For example, referring to FIG. 1, electrons of the medium 108 may be stimulated to relax from the excited energy state 120 to the ground state 118, with the accompanying release of a photon (an emitted photon 111) having a higher energy than an energy of absorbed photons (that induced a transition of electrons of the medium 108 from the ground state 118 to the excited energy state 120).

In the particular embodiment illustrated in FIG. 2, a third time period 212 (e.g., a time period from time t1 to time t2) separates the first time period 208 and the second time period 210. During the third time period 212, the laser cooling system 202 may transition between "pumping" the medium using the first pulsed laser 204 and "seeding" the medium using the second pulsed laser 206. In some cases, the third time period 212 may be less than a radiative lifetime associated with spontaneous emission of photons from the medium after the absorption of the photons (of light having the first wavelength generated by the first pulsed laser 204). That is, the second pulsed laser 206 may begin to "seed" the medium within a particular period of time after the first pulsed laser 104 has completed "pumping" the medium during the first time period 208. The particular period of time between the completion of the "pumping" and the beginning of the "seeding" may be less than the radiative lifetime associated with spontaneous emission of photons from the medium after the absorption of the photons.

FIG. 2 also illustrates that the second pulsed laser 206 may refrain from generating light having the second wavelength (to be directed toward the medium) during a fourth time period 214 (e.g., a time period from time t3 to time t4). The first pulsed laser 204 may begin to generate light having the first wavelength (to be directed toward the medium) after the fourth time period 214 has elapsed. To illustrate, the first pulsed laser 204 may direct light having the first wavelength toward the medium during a fifth time period 216 (e.g., a time period from time t4 to time t5). The fifth time period 216 may correspond to the first pulse width (e.g., the time period from time t0 to t1 corresponding to the first time period 208).

FIG. 2 further illustrates that the first pulsed laser 204 and the second pulsed laser 206 may continue in an iterative cycle. To illustrate, the second pulsed laser 206 may direct light having the second wavelength toward the medium during a time period after the fifth time period 216 (e.g., from time t6 to t7) that may correspond to the second pulse width (e.g., the time period from time t2 to t3 corresponding to the second time period 210). The first pulsed laser 306 may continue to operate according to a first duty cycle (e.g., from times t8 to t9, from times t12 to t13, and from times t16 to t17), and the second pulsed laser 206 may continue to operate according to a second duty cycle (e.g., from times t10 to t11 and from times t14 to t15), cycling between "pumping" the medium and "seeding" the medium in order to remove heat from the medium. While FIG. 2 illustrates a particular pulsed laser light profile having a shape of square waves, it will be appreciated that alternative pulsed laser light profiles may be utilized. For example, the shape may substantially correspond to a sine wave or to a trapezoidal wave, among other alternatives. To illustrate, a "rise time" may be associated with a particular laser transitioning from an "off" state to an "on" state, while a "fall time" may be associated with a particular laser transitioning from the "on" state to the "off" state. Further, a particular period of time may be associated with an overlap of a "rise time" of one laser and a "fall time" of another laser. As an illustrative example, in some cases, when the first pulsed laser 204 is transitioning from the "on" state to the "off" state (during a "fall time" after "pumping" the medium), the second pulsed laser 206 may begin transitioning from the "off" state to the "on" state (to "seed" the medium).

Thus, FIG. 2 illustrates that the first pulsed laser 204 of the laser cooling system 202 may be used to "pump" a medium to induce a transition of electrons in the medium to an excited energy state. The second pulsed laser 206 of the laser cooling system 202 may be used to "seed" the medium to stimulate emission of higher energy photons from the medium. FIG. 2 further illustrates that the first pulsed laser 204 and the second pulsed laser 206 may alternate between "pumping" the medium and "seeding" the medium to remove additional heat from the medium. Thus, the first pulsed laser 204 and the second pulsed laser 206 may cycle the medium (e.g., absorb/emit) at a rate that is independent of the spontaneous emission radiative lifetime.

Figure 3:
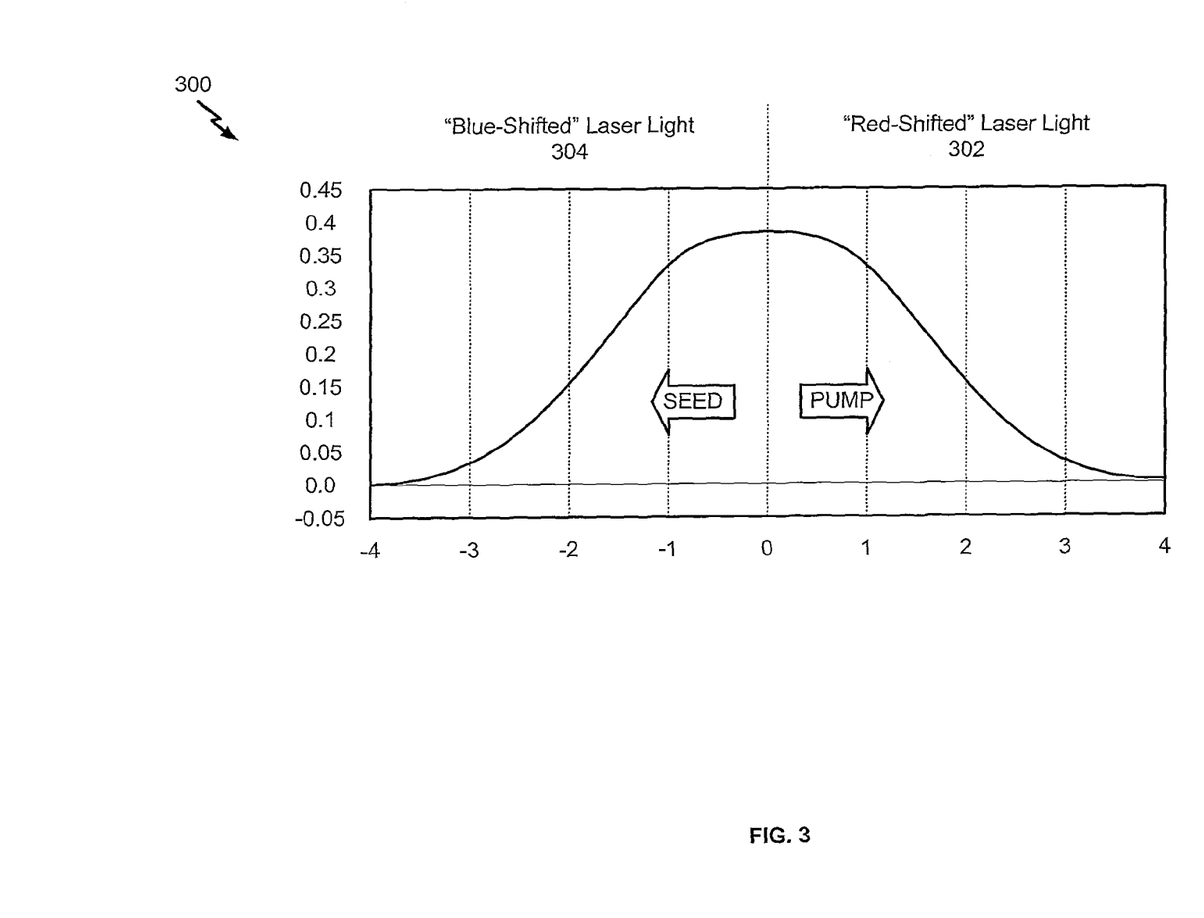
FIG. 3 is an illustration depicting an absorption profile of a medium, including probabilities associated with individual emitted photons having a higher energy or a lower energy than an energy of an absorbed photon.

FIG. 3 illustrates an example of an absorption profile 300 of a medium. The absorption profile 300 indicates probabilities associated with individual emitted photons having a higher energy or a lower energy than an energy of an absorbed photon. FIG. 3 illustrates that a "pump" laser may be tuned to direct "red-shifted" laser light 302 toward a medium, and a "seed" laser may be tuned to direct "blue-shifted" laser light 304 toward the medium.

For illustrative purposes only, FIG. 3 depicts a standard Gaussian distribution as a simplified system. In the case of spontaneous emission, a probability of a particular emitted photon having a higher energy or a lower energy than an energy of an absorbed photon may be determined based on the Gaussian distribution. To illustrate, in the case of spontaneous emission, photons on the left side of the curve may induce cooling. Cooling from spontaneous emission results from more emitted photons falling on the left side of the curve than emitted photons falling on the right side of the curve. Stimulating emission of photons may result in an increase in the portion of emitted photons (e.g., over 50 percent, potentially approaching 100 percent) that fall on the left side of the curve (that are associated with cooling).

Thus, FIG. 3 illustrates that a first laser may be used to "pump" electrons of a medium to an excited energy state, and a second laser may be used to "seed" the medium (i.e., to stimulate emission of photons from the medium). The first laser (the "Pump" laser) may be tuned to direct the "red-shifted" laser light 302 toward the medium (in accordance with the absorption profile 300 associated with the medium). The second laser (the "Seed" laser) may be tuned to direct the "blue-shifted" laser light 304 toward the medium (in accordance with the absorption profile 300). Directing the "red-shifted" laser light 302 and the "blue-shifted" laser light 304 toward the medium may result in an increase in a portion of photons emitted from the medium that are associated with cooling (i.e., having a higher energy than an energy of absorbed photons).

Figure 4:
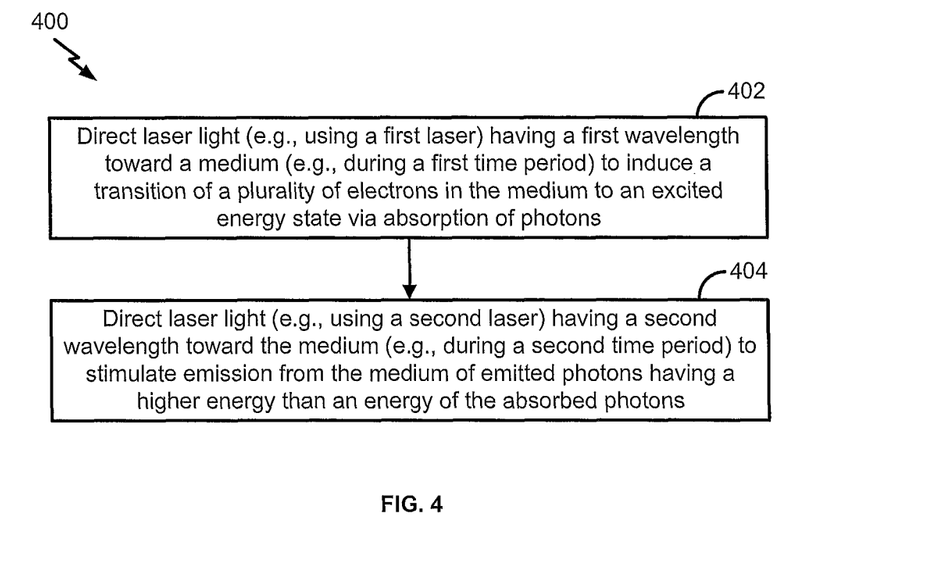
FIG. 4 is a flowchart depicting an exemplary embodiment of a method of laser cooling (e.g., using multiple lasers)

FIG. 4 is a flowchart depicting an exemplary embodiment of a method 400 of laser cooling. The method 400 may be performed by the laser cooling system 102 of FIG. 1 or the laser cooling system 202 of FIG. 2. In FIG. 4, laser light having a first wavelength may be directed toward a medium (e.g., using a first laser) to excite electrons in the medium (via absorption of photons), and laser light having a second wavelength may be directed toward the medium (e.g., using a second laser) to stimulate emission of photons from the medium that have a higher energy than an energy of the absorbed photons.

The method 400 includes directing laser light having a first wavelength toward a medium (e.g., using a first laser), at 402. The laser light having the first wavelength may be directed toward the medium during a first time period to induce a transition of a plurality of electrons in the medium to an excited energy state via absorption of photons. For example, referring to FIG. 1, the first laser 104 of the laser cooling system 102 may direct light having the first wavelength 114 toward the medium 108 (e.g., during a first time period) to induce the transition of electrons from the ground state 118 to the excited state 120 via absorption of photons (as shown at 110). As another example, FIG. 2 illustrates an embodiment in which the first pulsed laser 204 generates light having a first wavelength (to be directed toward a medium, such as the medium 108 of FIG. 1) during the first time period 208. FIG. 3 illustrates that the first wavelength may represent "red-shifted" laser light 302 (in accordance with the absorption profile 300 of the medium).

The method 400 also includes directing laser light having a second wavelength toward the medium (e.g., using a second laser), at 404. The laser light having the second wavelength may be directed toward the medium during a second time period to stimulate emission from the medium of photons (emitted photons) that have a higher energy than an energy of the absorbed photons. For example, referring to FIG. 1, the second laser 106 of the laser cooling system 102 may direct light having the second wavelength 116 toward the medium 108 (e.g., during a second time period after the first time period) to stimulate emission from the medium 108 of photons that have a higher energy than an energy of the absorbed photons (as shown at 112). As another example, FIG. 2 illustrates an embodiment in which the second pulsed laser 206 generates light having a second wavelength (to be directed toward a medium, such as the medium 108 of FIG. 1) during the second time period 210. FIG. 3 illustrates that the second wavelength may represent "blue-shifted" laser light 304 (in accordance with the absorption profile 300 of the medium).

Thus, FIG. 4 illustrates a method of laser cooling in which laser light having a first wavelength may directed toward a medium (e.g., using a "Pump" laser) to excite electrons in the medium (e.g., the medium 108 of FIG. 1) via photon absorption. Laser light having a second wavelength may be directed toward the medium (e.g., using a "Seed" laser) to stimulate emission of photons from the medium that have a higher energy than an energy of the absorbed photons.

Figure 5:
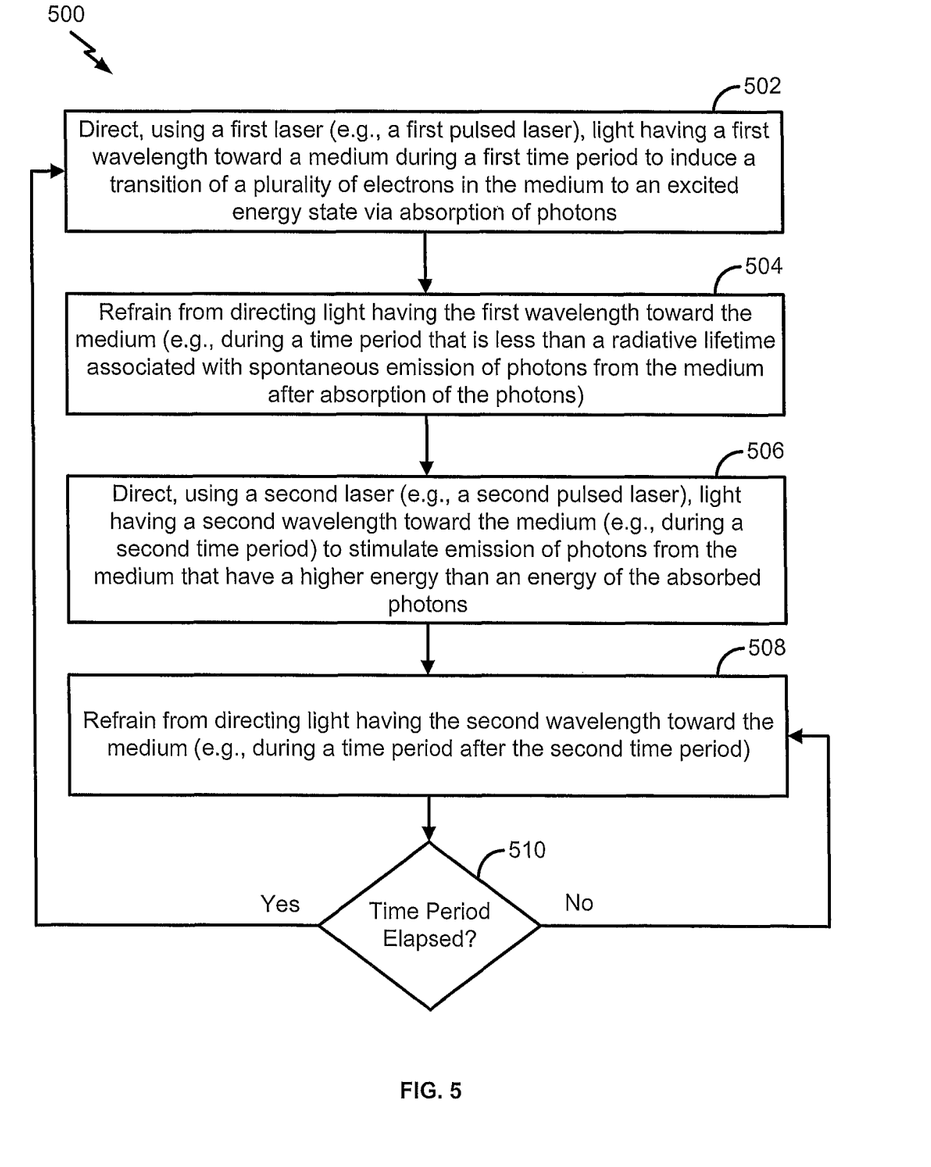
FIG. 5 is a flowchart depicting another exemplary embodiment of a method of laser cooling (e.g., using multiple lasers)

FIG. 5 is a flowchart depicting another exemplary embodiment of a method 500 of laser cooling. The method 500 may be performed by the laser cooling system 102 of FIG. 1 or the laser cooling system 202 of FIG. 2. In FIG. 5, a first pulsed laser may be used to excite electrons in a medium (via absorption of photons) during a first time period, and a second pulsed laser may be used to stimulate emission of photons from the medium that have a higher energy than an energy of the absorbed photons during a subsequent time period.

The method 500 includes directing light having a first wavelength toward a medium using a first laser, at 502. The first laser may direct the light having the first wavelength toward the medium during a first time period to induce a transition of a plurality of electrons in the medium to an excited energy state via absorption of photons. For example, referring to FIG. 1, the first laser 104 of the laser cooling system 102 may represent a first pulsed laser that directs light having the first wavelength 114 toward the medium 108 (e.g., during a first time period) to induce the transition of electrons in the medium 108 from the ground state 118 to the excited state 120 via absorption of photons (as shown at 110). As another example, referring to FIG. 2, the first pulsed laser 204 of the laser cooling system 202 may direct light having the first wavelength toward the medium during the first time period 208 (corresponding to a first pulse width) to "pump" the medium by inducing electrons to transition to an excited energy state.

The method 500 includes refraining from directing light having the first wavelength toward the medium, at 504. For example, referring to FIG. 1, the first laser 104 may refrain from directing light having the first wavelength 114 toward the medium 108 after the first time period associated with the absorption of the photons (as shown at 110). As another example, referring to FIG. 2, the first pulsed laser 204 may refrain from directing light having the first wavelength toward the medium during the third time period 212 (that separates the first time period 208 associated with the first pulse width and the second time period 210 associated with the second pulse width).

The method 500 also includes directing light having a second wavelength toward the medium using a second laser, at 506. The second laser may direct the light having the second wavelength toward the medium during a second time period to stimulate emission of photons from the medium (emitted photons) having a higher energy than an energy of the absorbed photons. For example, referring to FIG. 1, the second laser 106 of the laser cooling system 102 may direct light having the second wavelength 116 toward the medium 108 (e.g., during a second time period after the first time period) to stimulate emission of photons from the medium 108 that have a higher energy than an energy of the absorbed photons (as shown at 112). As another example, referring to FIG. 2, the second pulsed laser 206 of the laser cooling system 202 may direct light having the second wavelength toward the medium during the second time period 210 (corresponding to a second pulse width) to "seed" the medium (to stimulate emission of higher energy photons from the medium). In some cases, the second laser may begin directing light having the second wavelength toward the medium within a time period that is less than a radiative lifetime associated with spontaneous emission of photons from the medium after the absorption of the photons.

The method 500 includes refraining from directing light having the second wavelength toward the medium, at 508. For example, referring to FIG. 1, the second laser 106 may refrain from directing light having the second wavelength 116 toward the medium 108. To illustrate, the second laser 106 may refrain from directing light having the second wavelength 116 during a time period after the second time period. As another example, referring to FIG. 2, the second pulsed laser 206 may refrain from directing light having the second wavelength toward the medium during the fourth time period 214 (before the first pulsed laser 204 directs light having the first wavelength toward the medium during the fifth time period 216).

The method 500 may also include determining whether the time period to refrain from directing light having the second wavelength toward the medium has elapsed, at 510. When the time period has not expired, the method 500 may include continuing to refrain from directing light having the second wavelength toward the medium (by returning to 508). For example, referring to FIG. 2, the second pulsed laser 206 may refrain from directing light having the second wavelength toward the medium during the fourth time period 214.

When the time period has expired, the method 500 may return to 502, and the first laser may direct light having the first wavelength toward the medium to induce transition of electrons to the excited energy state via absorption of photons. For example, referring to FIG. 1, the first laser 104 of the laser cooling system 102 may direct light having the first wavelength 114 toward the medium 108 to induce transition of electrons from the ground state 118 to the excited state 120 via absorption of photons (as shown at 110). As another example, referring to FIG. 2, the first pulsed laser 204 may direct light having the first wavelength toward the medium during the fifth time period 216 (corresponding to the first pulse width) to "pump" the medium by inducing electrons to transition to the excited energy state.

After directing the light having the first wavelength toward the medium (at 502), FIG. 5 illustrates that the method 500 may continue in an iterative cycle. To illustrate, referring to FIG. 2, the second pulsed laser 206 may direct light having the second wavelength toward the medium during a subsequent time period (e.g., from time t6 to t7) corresponding to the second pulse width. The first pulsed laser 206 may continue to operate according to a first duty cycle, and the second pulsed laser 206 may continue to operate according to a second duty cycle, cycling between "pumping" the medium and "seeding" the medium in order to remove heat from the medium.

Thus, FIG. 5 illustrates that a first pulsed laser may be used to "pump" a medium to induce a transition of electrons in the medium to an excited energy state. After the first pulsed laser "pumps" the medium, a second pulsed laser may be used to "seed" the medium (to stimulate emission of higher energy photons from the medium). FIG. 5 further illustrates that the two lasers may alternate between "pumping" the medium and "seeding" the medium to remove additional heat from the medium.

Figure 6:
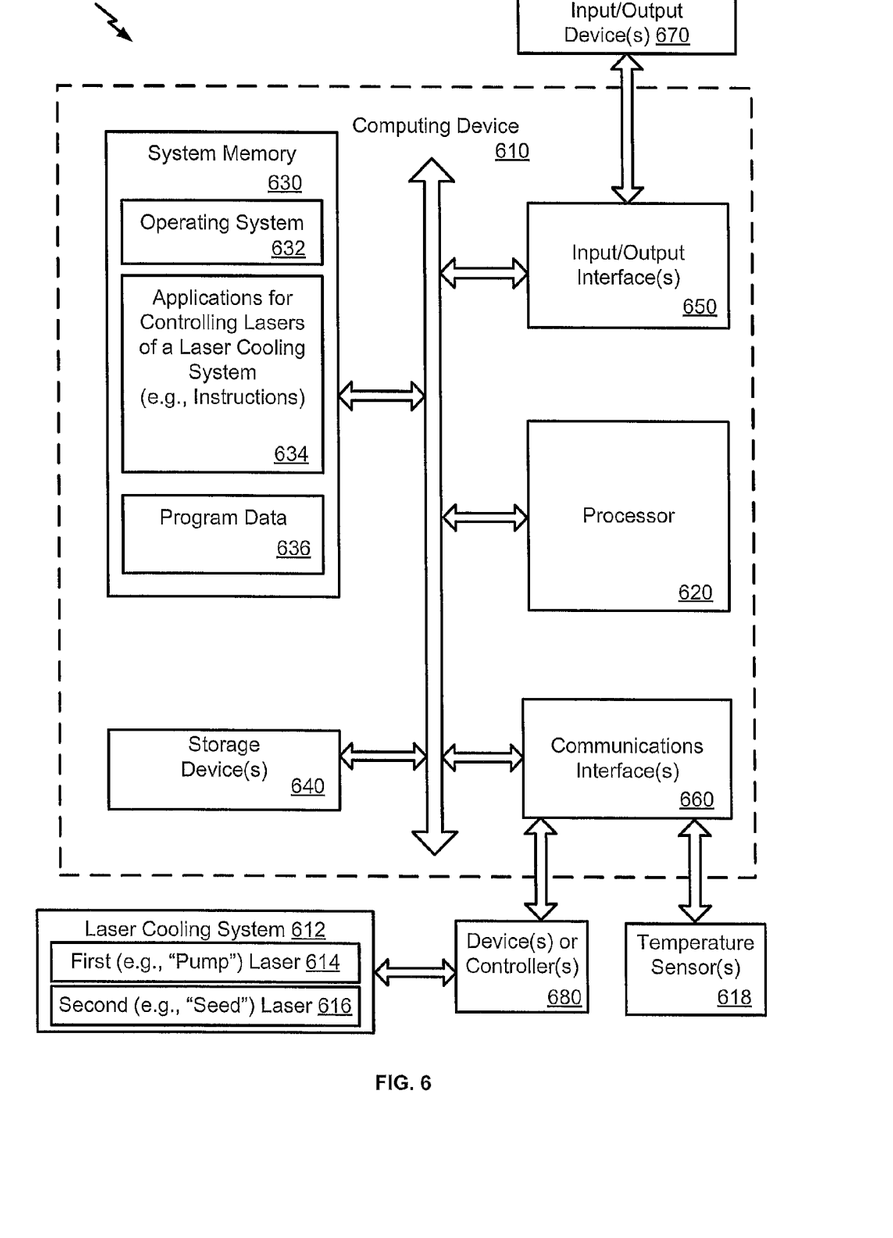
FIG. 6 is an illustration of a block diagram of a computing environment including a general purpose computing device configured to support embodiments of computer-implemented methods and computer-executable program instructions (or code) according to the present disclosure.

FIG. 6 is an illustration of a block diagram of a computing environment 600 including a general purpose computing device 610 configured to support embodiments of computer-implemented methods and computer-executable program instructions (or code) according to the present disclosure. For example, the computing device 610, or portions thereof, may execute instructions to control a laser cooling system 612 that includes at least one laser. FIG. 6 illustrates a particular embodiment in which the laser cooling system 612 includes a first laser 614 (e.g., a "pump" laser) and a second laser 616 (e.g., a "seed" laser). In alternative embodiments, a single laser may be tunable to direct laser light having the first wavelength toward the medium (to "pump" the medium) and to direct laser light having the second wavelength toward the medium (to "seed" the medium). In some cases, the laser cooling system 612 may correspond to the laser cooling system 102 of FIG. 1 or the laser cooling system 202 of FIG. 2. The instructions to control the laser cooling system 612 may include instructions to activate the first laser 614 to generate light having a first wavelength to be directed toward a medium, to adjust the first wavelength of the light to be directed toward the medium (e.g., based on an absorption profile associated with the medium), or to deactivate the first laser 614. The instructions to control the laser cooling system 612 may further include instructions to activate the second laser 616 to generate light having a second wavelength to be directed toward a medium, to adjust the second wavelength of the light to be directed toward the medium (e.g., based on the absorption profile associated with the medium), or to deactivate the second laser 616. The computing device 610, or portions thereof, may further execute instructions according to any of the methods described herein.

The computing device 610 may include a processor 620. The processor 620 may communicate with the system memory 630, one or more storage devices 640, one or more input/output interfaces 650, one or more communications interfaces 660, or a combination thereof. The system memory 630 may include volatile memory devices (e.g., random access memory (RAM) devices), nonvolatile memory devices (e.g., read-only memory (ROM) devices, programmable read-only memory, and flash memory), or both. The system memory 630 may include an operating system 632, which may include a basic/input output system for booting the computing device 610 as well as a full operating system to enable the computing device 610 to interact with users, other programs, and other devices. The system memory 630 may include one or more applications 634 which may be executable by the processor 620. For example, the one or more application 634 may include instructions executable by the processor 620 to control the laser cooling system 612. The system memory 630 may include program data 636 usable for controlling the laser cooling system 612, such as absorption profile(s) associated with particular materials (e.g., solid state materials).

The processor 620 may also communicate with one or more storage devices 640. For example, the one or more storage devices 640 may include nonvolatile storage devices, such as magnetic disks, optical disks, or flash memory devices. The storage devices 640 may include both removable and non-removable memory devices. The storage devices 640 may be configured to store an operating system, images of operating systems, applications, and program data. In a particular embodiment, the memory 630, the storage devices 640, or both, include tangible computer-readable media.

The processor 620 may also communicate with one or more input/output interfaces 650 that enable the computing device 610 to communicate with one or more input/output devices 670 to facilitate user interaction. The input/output interfaces 650 may include serial interfaces (e.g., universal serial bus (USB) interfaces or Institute of Electrical and Electronics Engineers (IEEE) 1394 interfaces), parallel interfaces, display adapters, audio adapters, and other interfaces. The input/output devices 670 may include keyboards, pointing devices, displays, speakers, microphones, touch screens, and other devices. The processor 620 may detect interaction events based on user input received via the input/output interfaces 1150. Additionally, the processor 620 may send a display to a display device via the input/output interfaces 650.

The processor 620 may communicate with devices or controllers 680 via the one or more communications interfaces 660. The one or more communications interfaces 660 may include wired Ethernet interfaces, IEEE 802 wireless interfaces, other wireless communication interfaces, or other network interfaces. The devices or controllers 680 may include host computers, servers, workstations, and other computing devices. FIG. 6 illustrates a particular embodiment in which the devices or controllers 680 may be communicatively coupled to the laser cooling system 612. Thus, in particular embodiments, the computer device 120 may be usable to enable control of a laser cooling that includes multiple lasers. FIG. 6 further illustrates that the processor 620 may communicate with one or more sensors, such as one or more temperature sensors 618) that may be configured to measure a temperature of a medium, via the one or more communications interfaces 660. An absorption profile of a particular material is temperature dependent. Accordingly, temperature data received from the temperature sensor(s) 618 may be provided as an input to the processor 620 to adjust a wavelength of laser light from a "pump" laser (e.g., the first laser 614), a wavelength of laser light from a "seed" laser (e.g., the second laser 616), or a combination thereof. To illustrate, as the medium cools, both wavelengths of laser light may be adjusted based on a change in the absorption profile of the medium.

Embodiments described above are illustrative and do not limit the disclosure. It is to be understood that numerous modifications and variations are possible in accordance with the principles of the present disclosure.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A laser cooling system comprising:
   a first laser;
   a second laser; and
   a controller configured to:
   cause the first laser to apply first light pulses to a medium to induce a transition of a plurality of electrons in the medium to an excited energy state via absorption of photons of the first light pulses, wherein the first light pulses have a first pulse width; and
   cause the second laser to apply second light pulses to the medium to stimulate emission of photons from the medium, the emitted photons having a higher energy than an energy of the absorbed photons, wherein the second light pulses have a second pulse width, wherein the second pulse width is different from the first pulse width, and wherein the combined application of the first light pulses and the second light pulses produces a net cooling effect on the medium.

2. The laser cooling system of claim 1, wherein the first laser is configured to generate the first light pulses at a first pulse rate, wherein the second laser is configured to generate the second light pulses at a second pulse rate, and wherein the first laser and the second laser comprise pulsed lasers.

3. The laser cooling system of claim 1, wherein the first laser is configured to generate a particular light pulse of the first light pulses during a first time period corresponding to the first pulse width, wherein the second laser is configured to generate a particular light pulse of the second light pulses during a second time period corresponding to the second pulse width, and wherein the second time period is after the first time period.

4. The laser cooling system of claim 3, wherein a third time period separates the first time period and the second time period, and wherein the third time period is less than a radiative lifetime associated with spontaneous emission of photons from the medium after the absorption of the absorbed photons.

5. The laser cooling system of claim 1, wherein the first light pulses have a first wavelength, wherein the first wavelength is determined based on a photon absorption profile associated with the medium, and wherein the second light pulses have a second wavelength that is less than the first wavelength.

6. A method of laser cooling, the method comprising:
   initiating a first laser to provide a first laser light pulse having a first wavelength toward a medium during a first time period to induce a transition of a plurality of electrons in the medium to an excited energy state via absorption of photons of the first laser light pulse, wherein the first laser light pulse has a first pulse width; and
   initiating a second laser to provide a second laser light pulse having a second wavelength toward the medium during a second time period to stimulate emission of photons from the medium, the emitted photons having a higher energy than an energy of the absorbed photons, wherein the second laser light pulse has a second pulse width, wherein the second pulse width is different from the first pulse width, and wherein providing the first laser light pulse and the second laser light pulse toward the medium produces a net cooling effect on the medium.

7. The method of claim 6, wherein a third time period occurs between the first time period and the second time period, and wherein the third time period is shorter than a radiative lifetime associated with spontaneous emission of photons from the medium after the absorption of the absorbed photons.

8. The method of claim 6, wherein the first wavelength is determined based on a photon absorption profile associated with the medium, and wherein the second wavelength is less than the first wavelength, and wherein the first laser and the second laser are the same laser.

9. The method of claim 6, wherein the first laser and the second laser comprise a single pulsed laser that provides the first laser light pulse at the first wavelength to the medium during the first time period and provides the second laser light pulse at the second wavelength to the medium during the second time period.

10. A laser cooling system comprising:
a first pulsed laser system;
a second pulsed laser system; and
a controller configured to:
cause the first pulsed laser system to direct first pulses of light having a first wavelength toward a medium to induce a transition of a plurality of electrons in the medium to an excited energy state via absorption of photons of the first pulses of light, wherein the first pulses of light have a first pulse width; and
cause the second pulsed laser system to direct second pulses of light having a second wavelength toward the medium to stimulate emission of photons from the medium, the emitted photons having a higher energy than an energy of the absorbed photons, wherein the second pulses of light have a second pulse width, wherein the second pulse width is different from the first pulse width, and wherein the combined application of the first pulses of light and the second pulses of light produces a net cooling effect on the medium.

11. The laser cooling system of claim 10, further comprising the medium, wherein the first wavelength is determined based on a photon absorption profile associated with the medium, and wherein the second wavelength is less than the first wavelength.

12. The laser cooling system of claim 10, wherein the second pulsed laser system is configured to direct a pulse of light having the second wavelength toward the medium after the first pulsed laser system has completed directing a pulse of light having the first wavelength toward the medium.

13. The laser cooling system of claim 10, wherein the first pulsed laser system is configured to generate a particular pulse of the first pulses of light during a first time period corresponding to the first pulse width, wherein the second pulsed laser system is configured to generate a particular pulse of the second pulses of light during a second time period corresponding to the second pulse width, and wherein the second time period is after the first time period.

14. The laser cooling system of claim 13, wherein a third time period occurs between the first time period and the second time period, and wherein the third time period is shorter than a radiative lifetime associated with spontaneous emission of photons from the medium after the absorption of the absorbed photons.

15. The laser cooling system of claim 1, wherein the first laser is configured to generate the first light pulses on a red end of a photon absorption profile associated with the medium, and wherein the second laser is configured to generate the second light pulses on a blue end of the photon absorption profile associated with the medium.

16. The laser cooling system of claim 1, wherein the first light pulses have a square wave profile, a sine wave profile, a sawtooth profile, or a trapezoidal profile, and wherein the first laser and the second laser have the same laser beam source.

17. The laser cooling system of claim 2, wherein the first pulse rate is the same as the second pulse rate, and wherein the first light pulses and the second light pulses have a square wave profile.

18. The laser cooling system of claim 10, wherein the first pulsed laser system comprises a plurality of lasers.

19. The laser cooling system of claim 1, wherein the medium has a first temperature prior to application of the first light pulses, wherein the medium has a second temperature after application of the second light pulses, and wherein the second temperature is less than the first temperature.

20. The laser cooling system of claim 1, wherein second photons of the second light pulses cause the medium to emit the emitted photons by stimulated emission, and wherein the emitted photons and the second photons of the second light pulses have the same frequency.

21. The laser cooling system of claim 20, wherein each emitted photon of the emitted photons has a direction that corresponds to a direction of a corresponding photon of the second photons of the second light pulses.

22. The laser cooling system of claim 1, wherein:
the first laser is configured to generate the first light pulses at a first pulse rate;
the second laser is configured to generate the second light pulses at a second pulse rate;
the first pulse rate is the same as the second pulse rate; and
the first pulse width is greater than the second pulse width.

* * * * *